United States Patent [19]

Ohta

[11] Patent Number: 5,710,644
[45] Date of Patent: Jan. 20, 1998

[54] COLOR EXPRESSING METHOD AND IMAGE PROCESSING APPARATUS THEREOF

[75] Inventor: Ken-ichi Ohta, Kawasaki, Japan

[73] Assignee: Canon Kabushiki Kaisha, Tokyo, Japan

[21] Appl. No.: 438,534

[22] Filed: May 10, 1995

Related U.S. Application Data

[63] Continuation of Ser. No. 996,647, Dec. 24, 1992, abandoned.

[30] Foreign Application Priority Data

Jan. 6, 1992 [JP] Japan .................. 4-000110

[51] Int. Cl.$^6$ .................. G03F 3/08; H04N 1/46
[52] U.S. Cl. .................. 358/518; 358/520; 358/523; 358/504; 382/167
[58] Field of Search .................. 358/515, 507, 358/518, 520, 523, 519, 504, 508, 509, 512, 513, 528, 529; 382/167; 395/131

[56] References Cited

U.S. PATENT DOCUMENTS

| | | | |
|---|---|---|---|
| 4,409,614 | 10/1983 | Eichler et al. | 358/518 |
| 4,500,919 | 2/1985 | Schreiber | 358/78 |
| 4,751,535 | 6/1988 | Myers | 358/520 |
| 4,769,718 | 9/1988 | Imamura | 358/482 |
| 4,941,038 | 7/1990 | Walowit | 358/504 |
| 4,965,663 | 10/1990 | Sasaki | 358/504 |
| 5,126,838 | 6/1992 | Ohsawa | 358/500 |
| 5,299,291 | 3/1994 | Ruetz | 358/518 |
| 5,422,739 | 6/1995 | Usami et al. | 358/518 |

FOREIGN PATENT DOCUMENTS

| | | | |
|---|---|---|---|
| 454273 | 10/1991 | European Pat. Off. | H04N 1/46 |

OTHER PUBLICATIONS

McColl et al., "Compression of Colour Image Data using Histogram Analysis and Clustering Techniques", Electronics and Communications Engineering, No. 1, 99. 93–100 (1989).

Roger et al., "Nutzungstiefe eines Videosystems", Elektronik, No. 7, pp. 84–88 (Jul. 1992).

Green et al., "Colour Error Reduction in Video Systems, IEEE Transactions on Broadcasting", No. 1, pp. 99–107 (Mar. 1990).

Mikami et al., "Full Color Image Printer", Fujitsu Scientific & Technical Journal, Summer, No. 2, pp. 166–174 (1988).

Sugiura et al., "The Color Space for Multi-Bender Communication", *Journal of the Institute of Image Electronics Engineers of Japan*, vol. 22, No. 1, 1993, pp. 11–19.

*Primary Examiner*—Scott A. Rogers
*Assistant Examiner*—Thomas D. Lee
*Attorney, Agent, or Firm*—Fitzpatrick, Cella, Harper & Scinto

[57] ABSTRACT

In a color expression method and an image processing apparatus using that method, characteristics of human vision which responds in proportion of a cube root of a luminance signal indicated by CIE L*a*b* colorimetric system is utilized. In look-up tables (for example), a cube-root (or other) conversion is performed and a difference signal of data on which the conversion has been performed is generated in subtraction circuits 104, 105. That is, 8-bit data for R, G, B are reduced to 7-bit data in the look-up tables, and each of two color signals after a subtraction operation is requantized to 6-bit data. Accordingly, color signals of 24 bits/pixel can be reduced to 19 bits/pixel, thus resulting in elimination of color data redundancy.

24 Claims, 9 Drawing Sheets

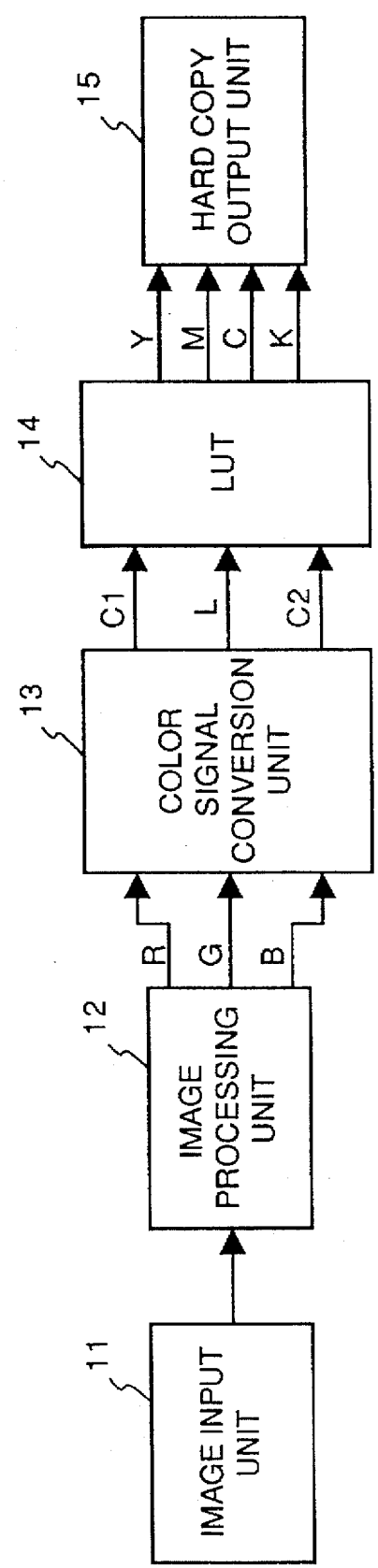

COLOR EXPRESSING METHOD AND IMAGE PROCESSING APPARATUS THEREOF

This application is a continuation of application Ser. No. 07/996,647, filed Dec. 24, 1992, now abandoned.

BACKGROUND OF THE INVENTION

The present invention relates to a color expression method and to an image processing apparatus employing that method.

In a conventional color expression method of a color image reading apparatus, colors of R (red), G (green), B (blue) signals standardized by television broadcasting, as shown in FIG. 7, are adopted for color sensitivity of the color separation system. This corresponds to characteristics of color development of R, G, B fluorescent materials in a cathode-ray tube which are used as luminous materials in a television receiver.

There is another color expression method using spectral sensitivity of the CIE 1931 standard colorimetric system or color separation system having spectral sensitivity of a narrow bandwidth in order to measure the density of ink used for an original (by transmission or reflection) or density of Y (yellow), M (magenta), C (cyan) fluorescent materials.

In a video camera/player, for example, there is a method in which color image signals read by the aforementioned method using spectral sensitivity are once stored in a magnetic tape and the R, G, B signals read out of it are outputted to a color monitor and the like. There is another method, such as a tintometer, where the read XYZ signal values are calculated and the calculated values are plotted on a chromaticity coordinate system of the CIE L*a*b* colorimetric system. There is another method where color correction processing is performed so as to correspond to the characteristics of a luminous material, e.g. ink or toner, and corrected color image signals are outputted by a color printer or a color copier. There is still another method in which a series of color image processings, such as color image reading, color correction, and output, is performed in a manner such that color image signals are stored in a hard disk of a computer or work station, and editing such as image synthesis and color transformation is performed on a color monitor of the computer.

In the above color image reading apparatus, however, as shown in FIG. 7, the chromaticity values of the R, G, B signals are located inside of a spectrum locus. Therefore, theoretically, spectral sensitivity characteristics of a color separation system used for the color image reading apparatus which generates R, G, B signals to satisfy the chromaticity values should be partially in a negative area.

However, it is impossible to realize the spectral sensitivity characteristics located partially in a negative area. Accordingly, as shown in FIG. 8, approximate values are obtained by spectral correction, that is, the characteristics in the negative area are eliminated, the characteristics are corrected as indicated by the dotted lines, or a primary transformation is performed for correction. In the above-described methods, however, the color characteristics of an objective original or an object are read with a considerable large amount of error.

Even if an original is accurately read, as shown in an xy chromaticity diagram of FIG. 9, color corresponding to a notation x which is located outside of the triangle which is formed by chromaticity values developed by the aforementioned fluorescent materials will have a negative signal value. This indicates the fact that when an object is exposed by a color video camera and played back by a video player, colors of the object cannot be accurately reproduced. In case of color copiers, the problem is that colors of the original image differ from those of a true duplication, that is, it is impossible to obtain an accurate color reproduction.

To solve the above problem, it is suggested to use color data expressed by a combination of reference color stimuli indicated by vertices of a triangle which is substantially circumscribed about a spectrum locus of the CIE chromaticity diagram as color data of data input/output in each unit such as an image input unit, image output unit, and other image processing unit of the color image processing apparatus.

However, even if such color data is used, since the color discrimination ability of human being is not taken account of, there is an inconvenience when image data is stored in a magnetic disk as a file or transmitted through a telephone communication lines. That is, when the tristimulus values of the R, G, B signals expressed by the three primary colors are each expressed in 8 bits, bits are allotted to colors which cannot be discriminated by human eyes and data redundancy is increased. Consequently, the amount of data to be stored or transmitted becomes rather large.

SUMMARY OF THE INVENTION

Accordingly, it is an object of the present invention to provide a color expression method and image processing apparatus thereof capable of eliminating color data redundancy, guaranteeing color reproduction in various media, and performing efficient data storage and data transmission while maintaining the quality of image data.

According to the present invention, the foregoing object is attained by an image processing apparatus comprising: means for obtaining first color signal data expressed by a combination of reference color stimuli data corresponding to vertices of a triangle which is substantially circumscribed about a spectrum locus of a chromaticity diagram; and data transform means for obtaining second color signal data by performing nonlinear transformation on the first color signal data, wherein the second color signal data is transformed to predetermined color component data as image information and the obtained image information is outputted as a visual output.

According to the present invention, the foregoing object is attained by a color expression method comprising the steps of: obtaining first color signal data expressed by a combination of reference color stimuli data corresponding to vertices of a triangle which is substantially circumscribed about a spectrum locus of a chromaticity diagram; obtaining second color signal data by performing nonlinear transformation on the first color signal data; and transforming the second color signal data to predetermined color component data, wherein the nonlinear transformation is a transformation such that the quantizing step becomes larger as the luminance of the first color signal data is higher.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a block diagram illustrating the construction of a color image processing apparatus according to the present embodiment of the present invention;

DESCRIPTION OF THE PREFERRED EMBODIMENTS

Preferred embodiments of the present invention will now be described in detail in accordance with the accompanying drawings.

Figure 6:
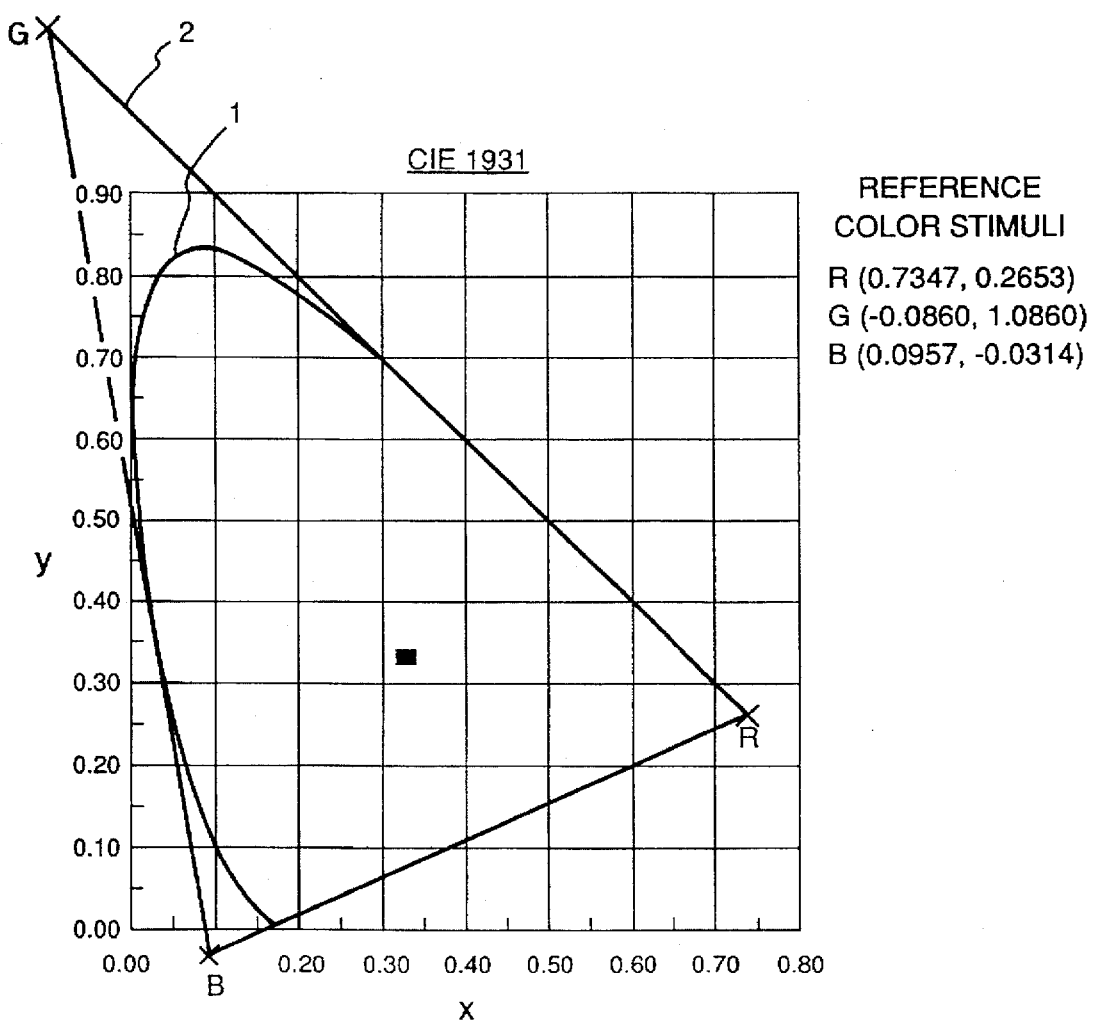
FIG. 6 is a reference color stimuli coordinate system according to the present embodiment.
Figure 7:
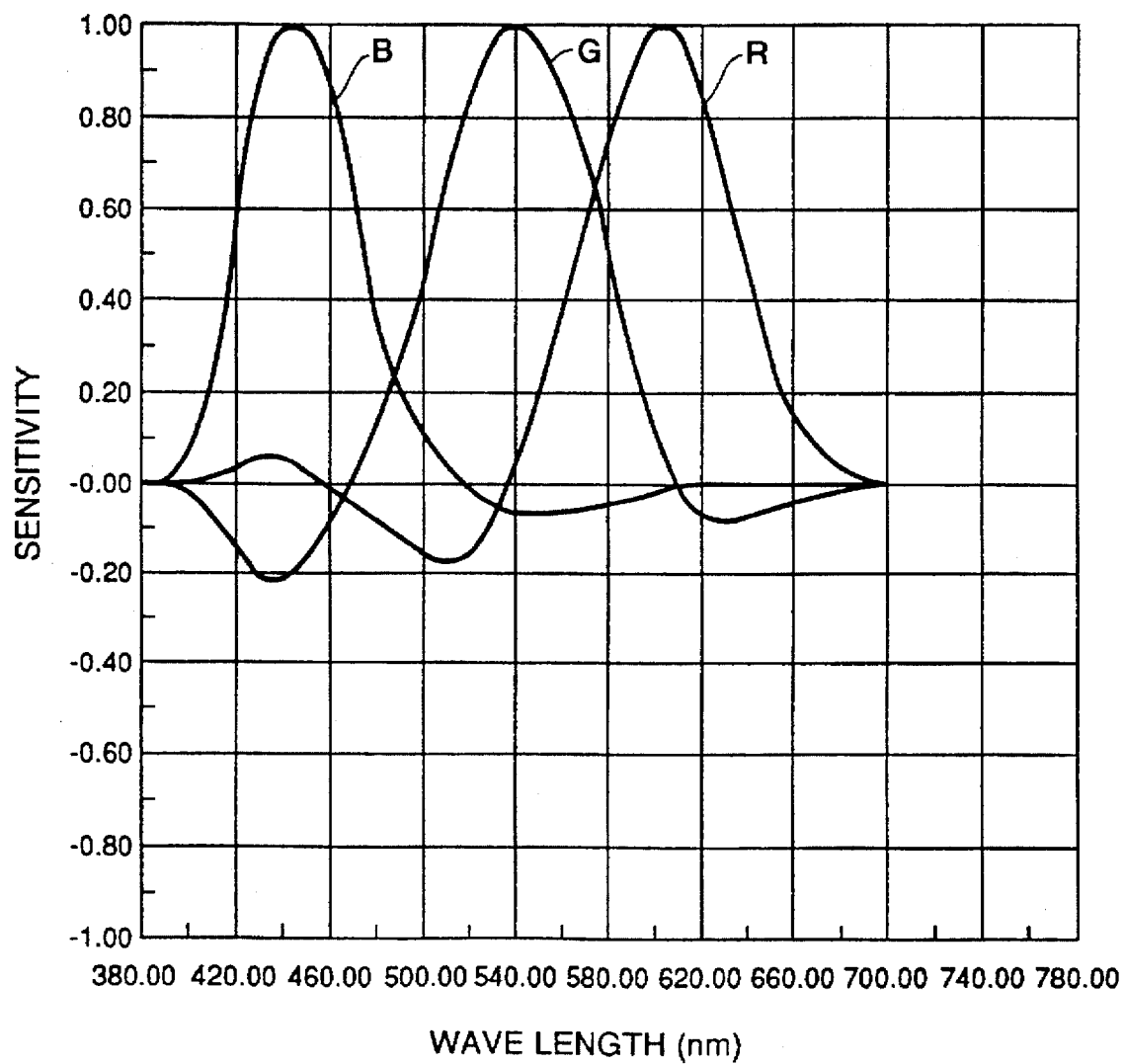
FIG. 7 is a diagram illustrating a spectral characteristic of color signals R, G, B which are standardized for TV broadcasting.
Figure 8:
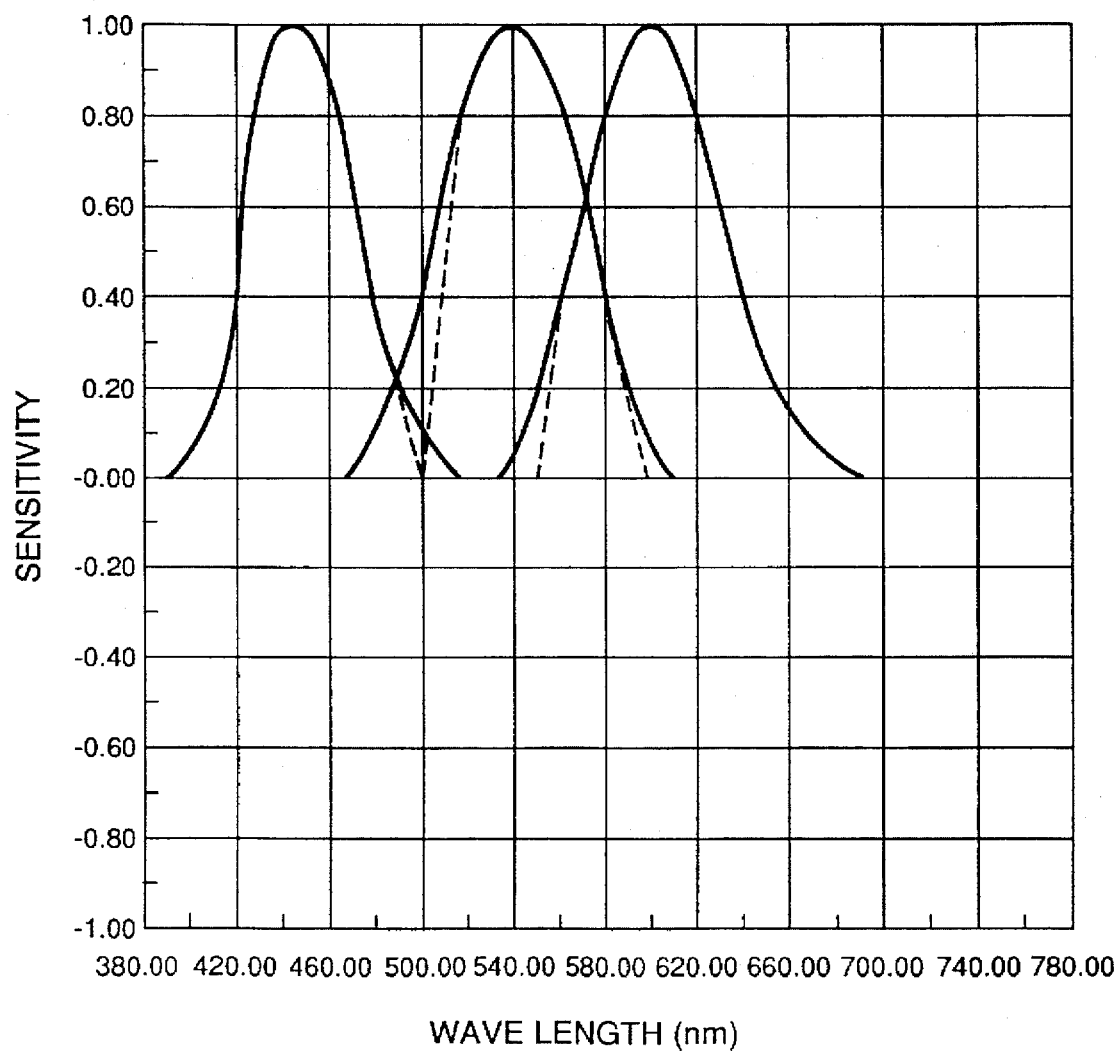
FIG. 8 is a diagram illustrating a characteristic of spectral sensitivity of signals R, G, B.
Figure 9:
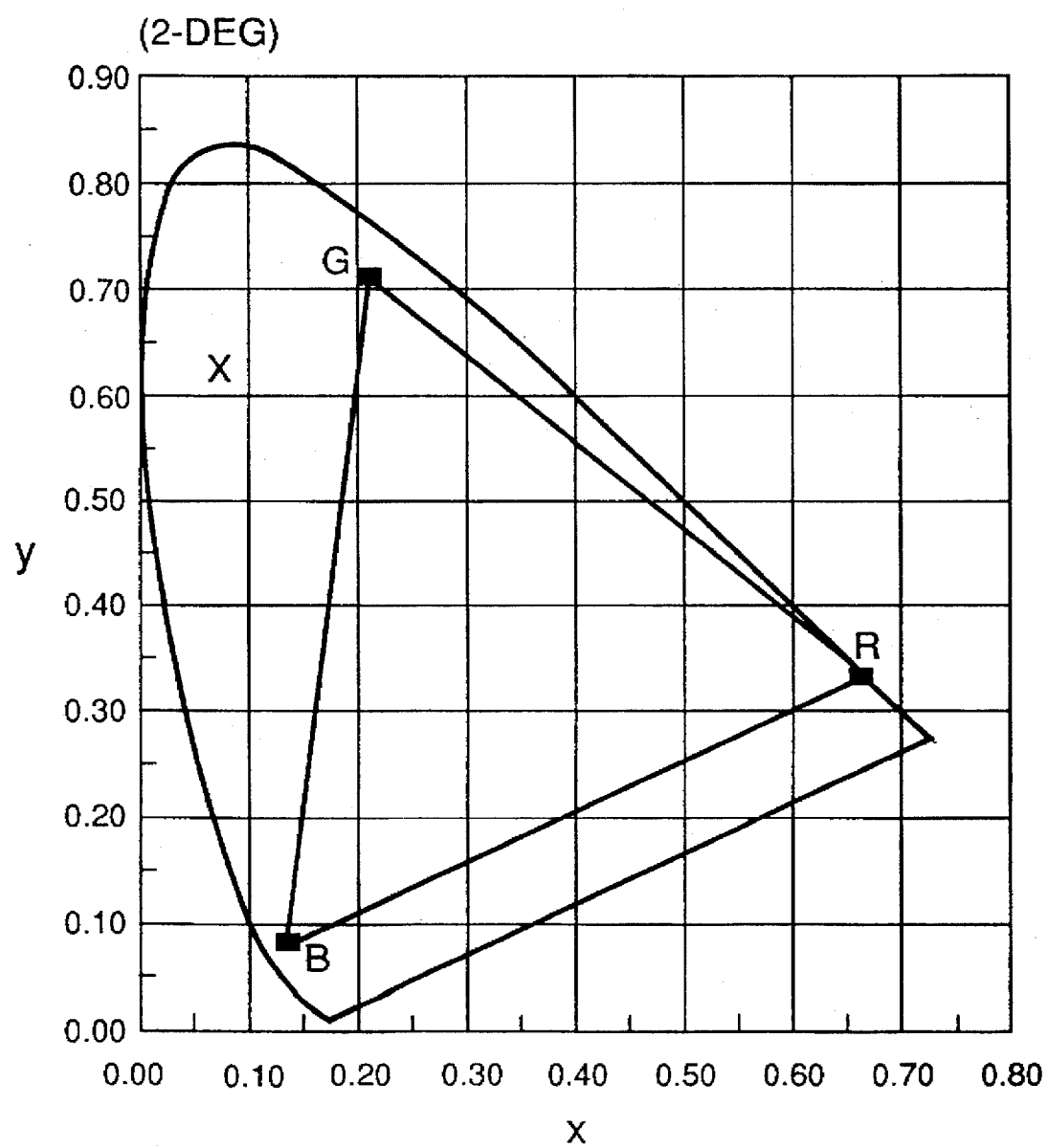
FIG. 9 is an xy chromaticity diagram.

In the present embodiment, three points indicated by notation x are expressed on a reference color stimuli coordinate system as shown in FIG. 6. These coordinates on the xy coordinate system are:

(0.7347, 0.2653)
(−0.0860, 1.0860).
(0.0957, −0.0314)

A triangle (numeral 2) formed by connecting these three points is circumscribed about an xy chromaticity value spectrum locus (numeral 1) approximately at 505 nm and 525 nm, and almost overlaps with a purple boundary connecting two points at 380 nm and 780 nm. Color signal values which can be obtained from the reference color stimuli coordinates are expressed by R, G, B, and a color signal expression which is suitable for data storage and data transmission can be obtained by performing a nonlinear transformation on R, G, B values.

Following are the equations to transform R, G, B values to color signal values L, C1, C2:

$$L = 255 \times (G/255)^{1/3}$$

$$C1 = 255 \times ((R/255)^{1/3} - (G/255)^{1/3})$$

$$C2 = 255 \times ((G/255)^{1/3} - (B/255)^{1/3}) \quad (1)$$

The reason for taking the cube root of each signal value is that human eyes respond proportionally to the cube root of the luminance signal as shown in the CIE L*a*b* colorimetric system. That is, human beings judge that an image quantized to 7 bits by the color signal value L is equivalent to an image quantized to 8 bits by the signal value G. Accordingly, the amount of information of the image is reduced to 7/8 without deterioration of an image quality by using the color signal value L.

In the above equations (1), the reason for taking differences of the cube roots of R, G, B values as color signal values C1, C2 is that the ability of color discrimination by human eyes decreases as the chroma becomes higher. Accordingly, even if the number of quantizing bit of the color signal values C1, C2, or a spatial resolution is reduced, the image quality will not deteriorate.

FIG. 1A is a block diagram illustrating a construction of a color image processing apparatus according to the present embodiment of the present invention. In FIG. 1A, an image signal is inputted to an image input unit 11 from an image signal source (not shown). An A/D conversion and sample-and-hold are performed in the image input unit 11.

In an image processing unit 12, shading correction or black correction is performed on the output signal from the image input unit 11, and the corrected signals are inputted into a color signal conversion unit 13 as R, G, B image signals.

The color signal conversion unit 13 performs quantization which is described later on the inputted R, G, B signals and outputs color signals, that is, L, C1, C2 signals, in which the number of bits per pixel is reduced. A look-up table (LUT) 14 transforms these inputted color signals L, C1, C2 into primary color signals Y, M, C, K as needed by a hard copy output unit 15.

Figure 1B:
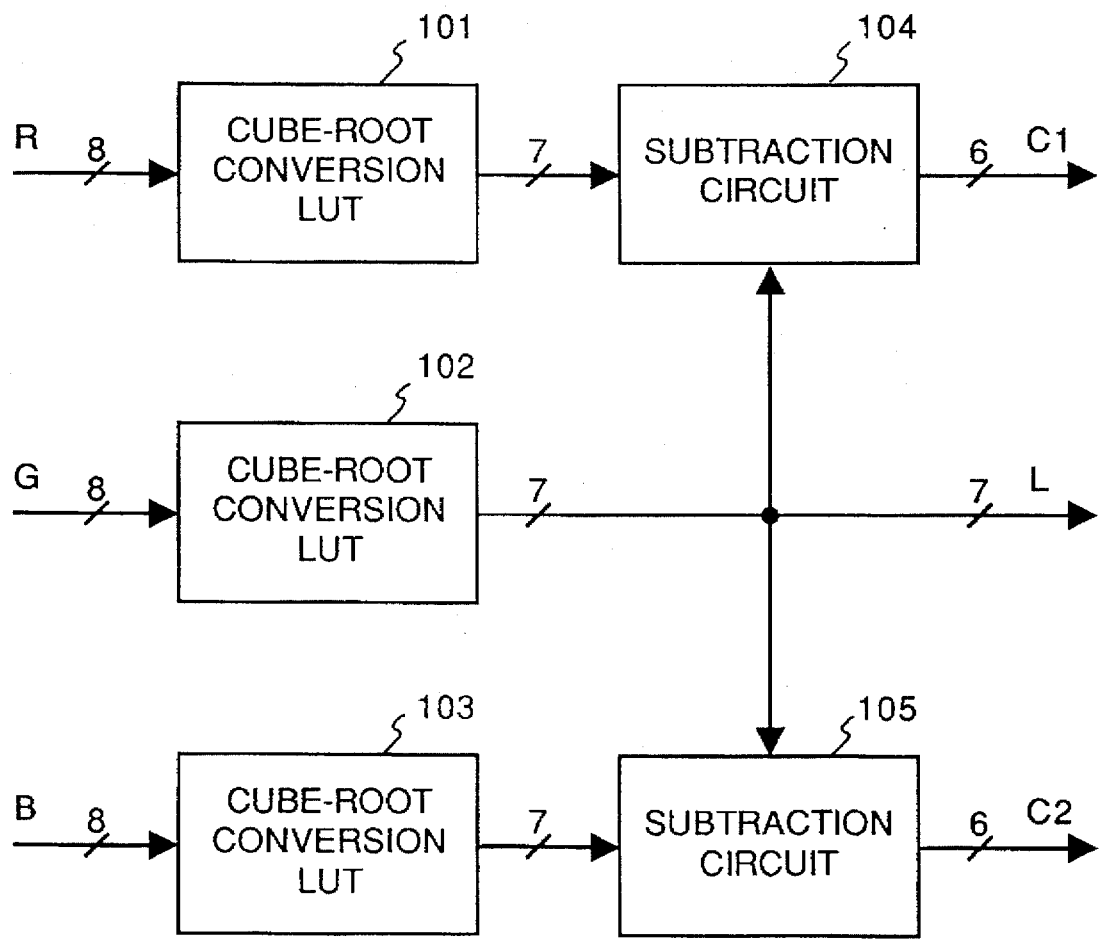
FIG. 1B is a block diagram illustrating the color signal conversion unit comprising the color image processing apparatus according to the present embodiment.

FIG. 1B is a block diagram illustrating the color signal conversion unit 13 performing a conversion expressed by the above equations (1) and comprising the color image processing apparatus according to the present embodiment. In FIG. 1B, numerals 101–103 are look-up tables which perform cube-root conversion, and numerals 104 and 105 are subtraction circuits for generating a difference signal. In the circuit of FIG. 1B, with respect to each 8-bit input of the R, G, B values, data on which a cube-root conversion is performed is quantized to 7 bits and each of the color signal values C1, C2 after the subtraction operation is requantized to 6 bits.

Accordingly, a color signal of 24=(8×3) bits/pixel can be reduced to one of 19=(6+7+6) bits/pixel, thus resulting in a reduction of the data amount to 19/24.

Next, a table conversion based upon the color signals L, C1, C2 is described.

Figure 2:
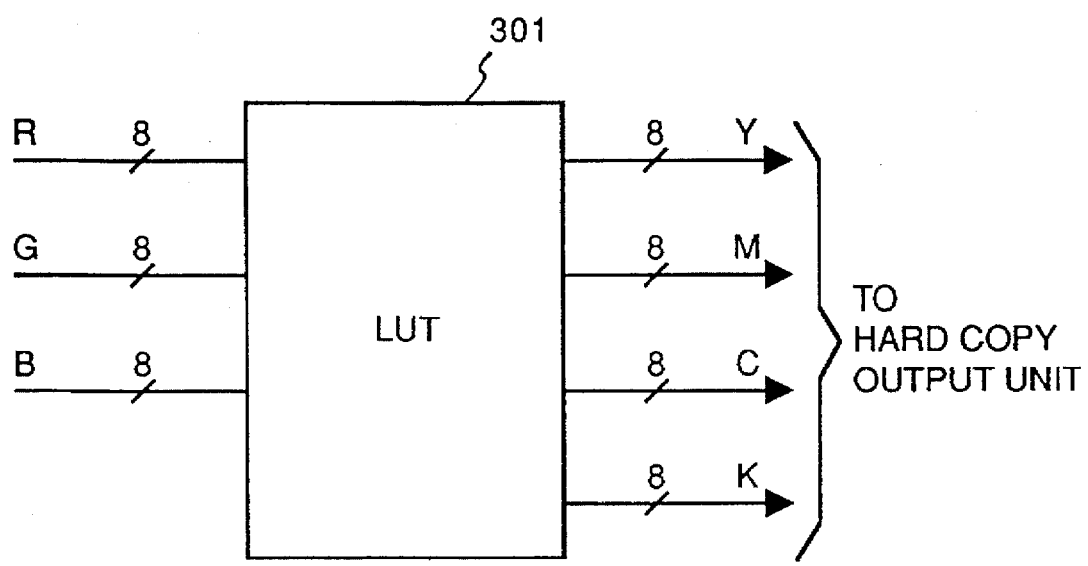
FIG. 2 illustrates a block diagram of a general look-up table for converting color image signals R, G, B to primary signals Y, M, C, K.

In order to output a hard copy of color image signals expressed by the signals R, G, B on a recording paper, the color image signals are transformed to primary color signals Y, M, C, K by the LUT 301 shown in FIG. 2. However, according to the construction of FIG. 2, the number of quantizing bits of each of the input/output signals R, G, B is 8 bits. The capacity necessary for the LUT is 64 megabytes which is not practical.

Figure 3:
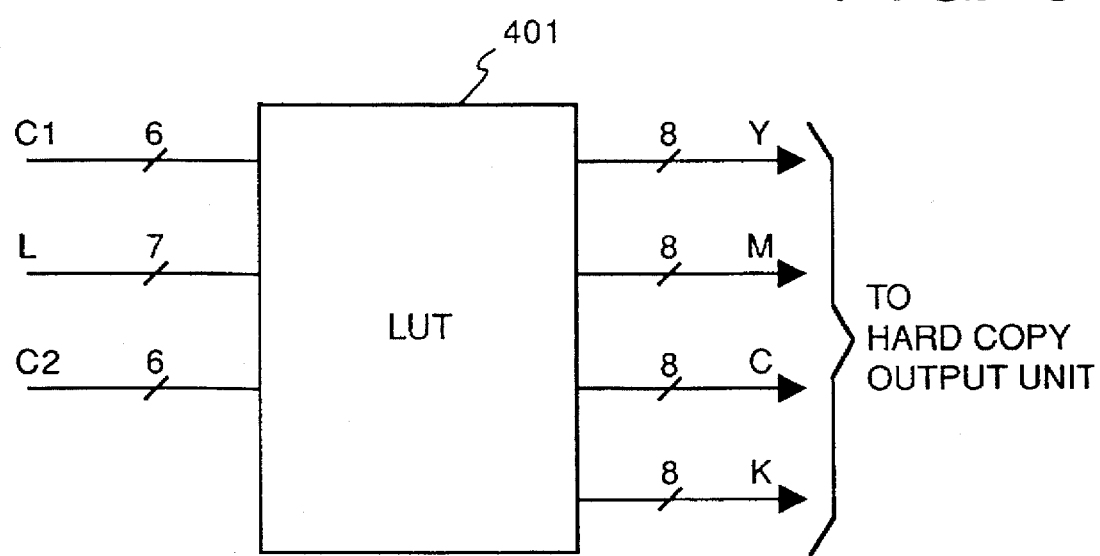
FIG. 3 illustrates a block diagram of a look-up table for converting color image signals L, C1, C2 to primary color signals Y, M, C, K according to the present embodiment.

In the present embodiment, as shown in FIG. 3, after the inputted signals R, G, B are transformed to color signals L, C1, C2, these signals are inputted to the LUT 401. The capacity necessary for the LUT is 2 megabytes when L=7 bits, C1=6 bits, and C2=6 bits. Consequently, the circuit size of the LUT can be reduced to 1/32 of the LUT shown in FIG. 2.

Accordingly, the amount of information for the image can be reduced without deterioration in the image quality by using color signals in which the color data redundancy has been removed in a manner such that a transformation is performed, with a consideration for the ability of color discrimination by human eyes, on the signals R, G, B expressed by a combination of the reference color stimuli data indicated by vertices of a triangle which is substantially circumscribed about a spectral locus of the CIE chromaticity diagram.

Modification 1

A modification of the above embodiment is described below.

In this modification, the color signal values L, C1, C2 are obtained by performing a nonlinear transform on the signals R, G, B:

$$L = 255 \times ((R/255)^{1/3} + (G/255)^{1/3} + (B/255)^{1/3})/3$$

$$C1 = 255 \times ((R/255)^{1/3} - (G/255)^{1/3})$$

$$C2 = 255 \times ((R/255)^{1/3}/2 + (G/255)^{1/3}/2 - (B/255)^{1/3}) \quad (2)$$

Figure 4:
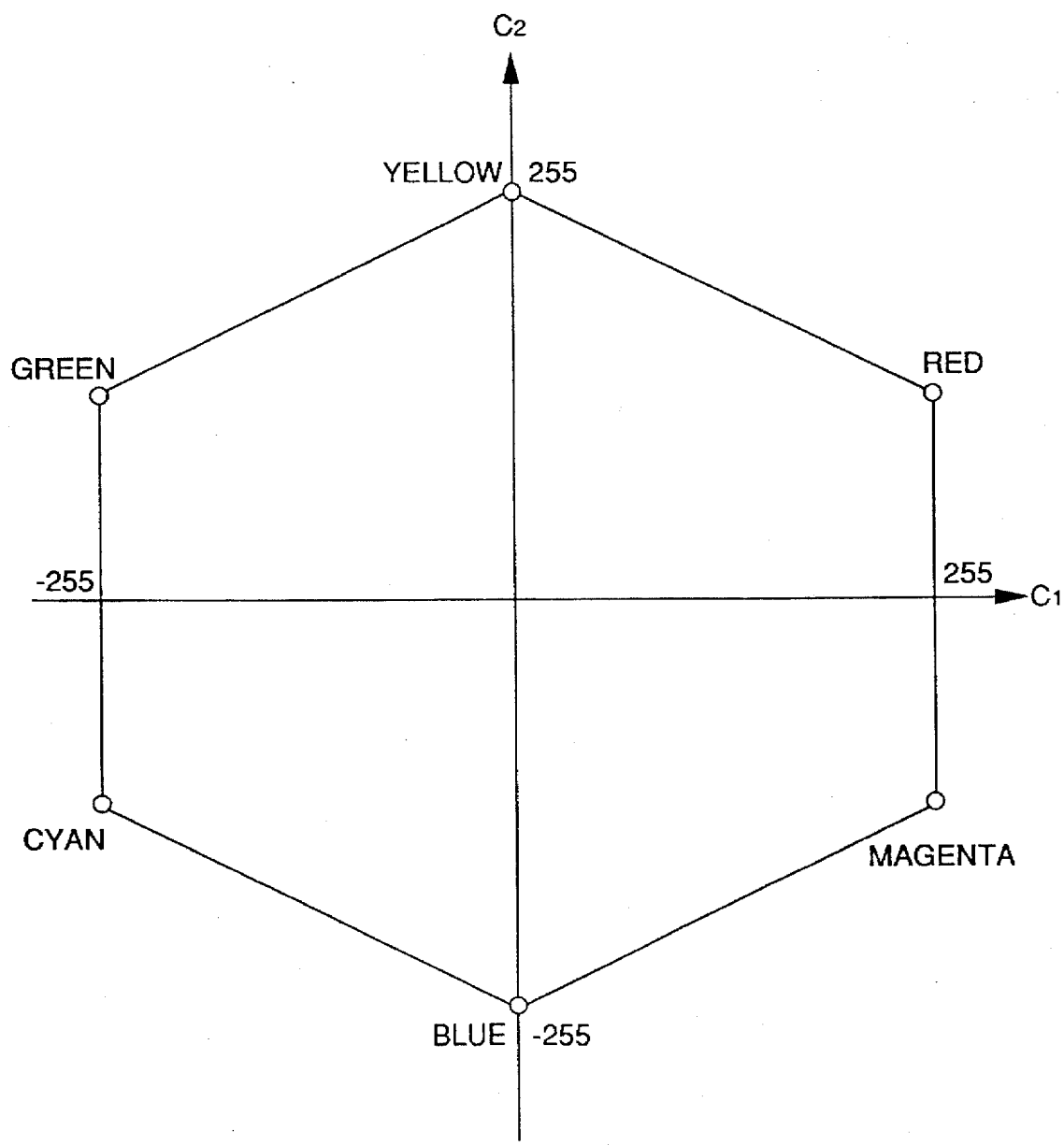
FIG. 4 is a diagram illustrating a color space of the basic six primary colors according to modification 1.

By using the equations (2), basic six primary colors such as red, green, blue, yellow, cyan, magenta are expressed by the signals R, G, B, that is, six colors expressed by (R, G, B)=(255, 0, 0), (0, 255, 0), (0, 0, 255), (255, 255, 0), (0, 255, 255), (255, 0, 255) form a hexagon in a color space, as shown in FIG. 4. Consequently, signal processing can be easily performed.

When the hexagon in FIG. 4 is expressed by color signal values L, C1, C2, simple values can be obtained as follows:

Red: (255/3, 255, 255/2)

Green: (255/3, −255, 255/2)

Blue: (255/3, 0, −255)

Yellow: (255×2/3, 0, 255)

Cyan: (255×2/3, −255, −255/2)

Magenta: (255×2/3, 255, −255/2)

In this way, according to the present modification, signal processing can be easily performed by using simple color signal values.

Modification 2

As a second example for modification, the color signal values L, C1, C2 are obtained from the color signal values R, G, B which can be obtained from the same reference stimuli coordinates as the above embodiment. That is:

$$L = -255/Dmax \times Log_{10}(G/255)$$

$$C1 = -255/Dmax \times (Log_{10}(R/255) - Log_{10}(G/255))$$

$$C2 = -255/Dmax \times (Log_{10}(G/255) - Log_{10}(B/255)) \quad (3)$$

As a model of visual characteristics of human eyes, Weber-Fechner's logarithmic response model is utilized. In equations (3), Dmax indicates a maximum density included in an image signal; a value of 1.5~2.0 is normally set.

Figure 5:
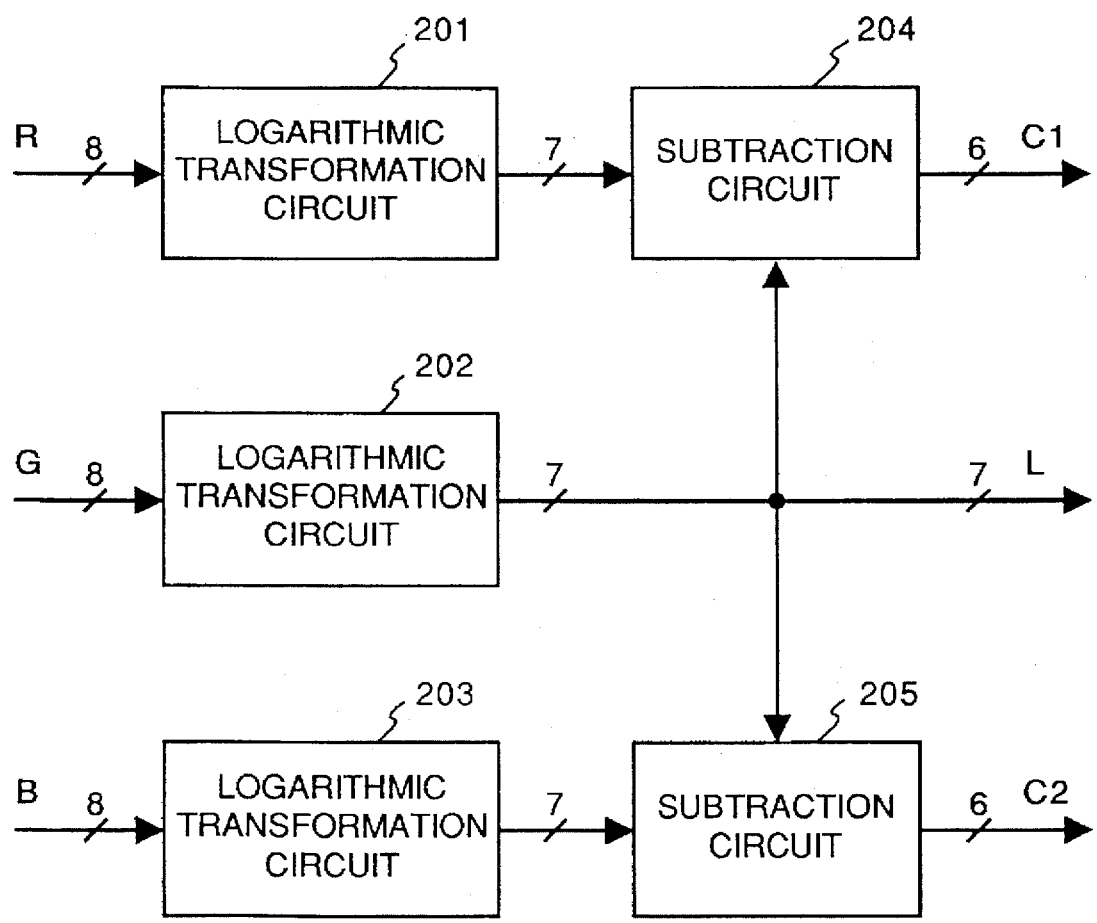
FIG. 5 is a block diagram illustrating the color signal conversion in the color image processing apparatus according to modification 2.

FIG. 5 is a block diagram illustrating the color signal conversion in the color image processing apparatus according to the modification 2. In FIG. 5, numerals 201~203 are look-up tables which perform logarithmic transformation. Numerals 204 and 205 are subtraction circuits which generate a difference signal of the transformed data. In FIG. 5, with respect to each 8-bit input of the R, G, B values, data after the logarithmic transformation is quantized to 7 bits, and the color signal values C1, C2 after the subtraction operation are quantized to 6 bits.

In this embodiment, the amount of image information can be reduced without deterioration in image quality.

The present invention can be applied to a system constituted by a plurality of devices, or to an apparatus comprising a single device. Furthermore, it goes without saying that the invention is applicable also to a case where the object of the invention is attained by supplying a program to a system or apparatus, rather than by using special hardware as in the illustrated embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

means for obtaining first color signal data expressed by a combination of three stimulus data corresponding to vertices of a triangle, wherein the triangle formed by connecting these three points circumscribes a spectrum locus on xy chromaticity coordinates approximately at 505 nm and 525 nm, and one side of the triangle includes a purple boundary connecting two points at 380 nm and 780 nm; and data transform means for obtaining second color signal data by performing a nonlinear transformation on the first color signal data.

2. The image processing apparatus according to claim 1, wherein said data transform means performs the nonlinear transformation such that a quantizing step becomes larger as the luminance of the first color signal data is higher.

3. The image processing apparatus according to claim 1, wherein said data transform means further comprises a memory table to input the second color signal data and output predetermined signal data.

4. The image processing apparatus according to claim 1, wherein said nonlinear transformation is a logarithmic transformation.

5. A color expression method comprising the steps of:

obtaining first color signal data expressed by a combination of three stimulus data corresponding to vertices of a triangle, wherein the triangle formed by connecting these three points circumscribes a spectrum locus on xy chromaticity coordinates approximately at 505 nm and 525 nm, and one side of the triangle includes a purple boundary connecting two points at 380 nm and 780 nm; and obtaining second color signal data by performing a nonlinear transformation on the first color signal data, wherein the nonlinear transformation is a transformation such that a quantizing step becomes larger as the luminance of the first color signal data is higher.

6. The color expression method according to claim 5, wherein the nonlinear transformation is a logarithmic transformation.

7. An image processing apparatus comprising:

means for obtaining first color signal data expressed by a combination of a three stimulus data corresponding to vertices of a triangle, wherein the triangle formed by connecting these three points circumscribes a spectrum locus on xy chromaticity coordinates approximately at 505 nm and 525 nm, and one side of the triangle includes a purple boundary connecting two points at 380 nm and 780 nm;

means for independently performing a nonlinear transformation on the color signal data; and data transform means for obtaining a color separation signal from a difference of a signal value after the nonlinear transformation, wherein the color separation signal is transformed to predetermined color component data as image information and the obtained image information is outputted as a visual output.

8. The image processing apparatus according to claim 7, wherein said data transform means performs nonlinear transformation so that the number of quantizing bit of said color separation signal is less than that of R, G, B signals.

9. The image processing apparatus according to claim 7, wherein said data transform means further comprises a memory table to input said color separation signal and output a predetermined signal.

10. The image processing apparatus according to claim 7, wherein said nonlinear transformation is logarithmic transformation.

11. A color expression method comprising the steps of:
obtaining first color signal data expressed by a combination of three stimulus data corresponding to vertices of a triangle, wherein the triangle formed by connecting these three points circumscribes a spectrum locus on xy chromaticity coordinates approximately at 505 nm and 525 nm, and one side of the triangle includes a purple boundary connecting two points at 380 nm and 780 nm;
performing a nonlinear transformation independently on the obtained color signal data;
obtaining a color separation signal from a difference of a signal value after the nonlinear transformation; and
transforming the color separation signal to predetermined component data,
wherein the nonlinear transformation is a transformation such that a number of quantizing bits of the color separation signal is less than the number of quantizing bits of R, G, B signals.

12. The color expression method according to claim 11, wherein said nonlinear transformation is logarithmic transformation.

13. An image processing method comprising the steps of:
obtaining first color signal data expressed by a combination of three stimulus data corresponding to vertices of a triangle, wherein the triangle formed by connecting these three points circumscribes a spectrum locus on xy chromaticity coordinates approximately at 505 nm and 525 nm, and one side of the triangle includes a purple boundary connecting two points at 380 nm and 780 nm; and
transforming data for obtaining second color signal data by performing a nonlinear transformation on the first color signal data.

14. The image processing method according to claim 13, wherein the nonlinear transformation is such that a quantizing step becomes larger as the luminance of the first color signal data is higher.

15. The image processing method according to claim 13, wherein the nonlinear transformation is performed using a memory table to input the second color signal data and output predetermined signal data.

16. The image processing method according to claim 13, wherein the nonlinear transformation is a logarithmic transformation.

17. A color expressing apparatus comprising:
means for obtaining first color signal data expressed by a combination of three stimulus data corresponding to vertices of a triangle, wherein the triangle formed by connecting these three points circumscribes a spectrum locus on xy chromaticity coordinates approximately at 505 nm and 525 nm, and one side of the triangle includes a purple boundary connecting two points at 380 nm and 780 nm;
means for obtaining second color signal data by performing nonlinear transformation on the first color signal data; and
means for transforming said second color signal data to predetermined color component data,
wherein the nonlinear transformation is such that a quantizing step becomes larger as the luminance of the first color signal data is higher.

18. The color expressing apparatus according to claim 17, wherein the nonlinear transformation is a logarithmic transformation.

19. An image processing method comprising the steps of:
obtaining first color signal data expressed by a combination of three stimulus data corresponding to vertices of a triangle, wherein the triangle formed by connecting these three points circumscribes a spectrum locus on xy chromaticity coordinates approximately at 505 nm and 525 nm, and one side of the triangle includes a purple boundary connecting two points at 380 nm and 780 nm;
independently performing a nonlinear transformation on the color signal data; and
transforming data for obtaining a color separation signal from a difference of a signal value after the nonlinear transformation,
wherein the color separation signal is transformed to predetermined color component data as image information and the obtained image information is outputted as a visual output.

20. The image processing method according to claim 19, wherein the data transformation is such that the number of quantizing bits of the color separation signal is less than that of R, G and B signals.

21. The image processing method according to claim 19, wherein said transforming step is performed using a memory table to input the color separation signal and output a predetermined signal.

22. The image processing method according to claim 19, wherein the nonlinear transformation is a logarithmic transformation.

23. A color expressing apparatus comprising:
means for obtaining first color signal data expressed by a combination of three stimulus data corresponding to vertices of a triangle, wherein the triangle formed by connecting these three points circumscribes a spectrum locus on xy chromaticity coordinates approximately at 505 nm and 525 nm, and one side of the triangle includes a purple boundary connecting two points at 380 nm and 780 nm;
means for performing nonlinear transformation independently on the color signal data;
means for obtaining a color separation signal from a difference of a signal value after the nonlinear transformation; and
means for transforming the color separation signal to predetermined component data,
wherein the nonlinear transformation is such that a number of quantizing bits of the color separation signal is less than the number of quantizing bits of R, G and B signals.

24. The color expressing apparatus according to claim 23, wherein the nonlinear transformation is a logarithmic transformation.

* * * * *

UNITED STATES PATENT AND TRADEMARK OFFICE
CERTIFICATE OF CORRECTION

PATENT NO. : 5,710,644

DATED : January 20, 1998

INVENTOR(S): KEN-ICHI OHTA

It is certified that error appears in the above-identified patent and that said Letters Patent is hereby corrected as shown below:

On the title page, item
[57] ABSTRACT

Line 3, "responds" should read --respond--.
Line 4, "is" should read --are--.

COLUMN 1

Line 62, "large" should be deleted.

COLUMN 2

Line 18, "a" (second occurrence) should be deleted.

COLUMN 7

Line 5, "bit" should read --bits--.

Signed and Sealed this

Fourth Day of August, 1998

Attest:

BRUCE LEHMAN

*Attesting Officer*  *Commissioner of Patents and Trademarks*